Oct. 19, 1965 H. V. LEWIS ETAL 3,212,798

FLEXIBLE PIPE COUPLING

Filed Feb. 12, 1962

INVENTORS
HAROLD V. LEWIS
AND LEONARD C. LIPTAK

BY Clarence R. Catty Jr.
ATTORNEY

United States Patent Office 3,212,798
Patented Oct. 19, 1965

3,212,798
FLEXIBLE PIPE COUPLING
Harold V. Lewis, Painted Post, and Leonard C. Liptak,
Corning, N.Y., assignors to Corning Glass Works, Corning, N.Y., a corporation of New York
Filed Feb. 12, 1962, Ser. No. 172,400
1 Claim. (Cl. 285—230)

This invention relates to couplings between sections of pipe.

In constructing pipe system, particularly those utilizing glass pipe, it is desirable to have a substantial amount of flexibility in the couplings used therein, both for convenience during installation and to avoid breakage thereafter when the pipes may be subjected to external forces, for example, those produced by the shifting or settling of the building in which the pipes have been installed.

Accordingly, it is an object of the present invention to provide a pipe coupling which will permit substantial angular movement between two joined sections of pipe while maintaining a fluid-tight seal therebetween.

It is a further object to provide a coupling which is resistant to high temperatures, high pressures and the action of corrosive chemicals transported therein.

These and other objects of the invention are accomplished by the provision of a coupling between two sections of pipe, one embodiment of which comprises two circular bands, one band overlapping the external surfaces of the two sections of pipe at the juncture of the pipes and the other being pressed between the opposed ends of the pipes, the bands having between them a gasket of a low durometer material, and means for pressing the two pipe sections together axially to force the ends of the pipes against the gasket to effect a seal.

Figure 1:
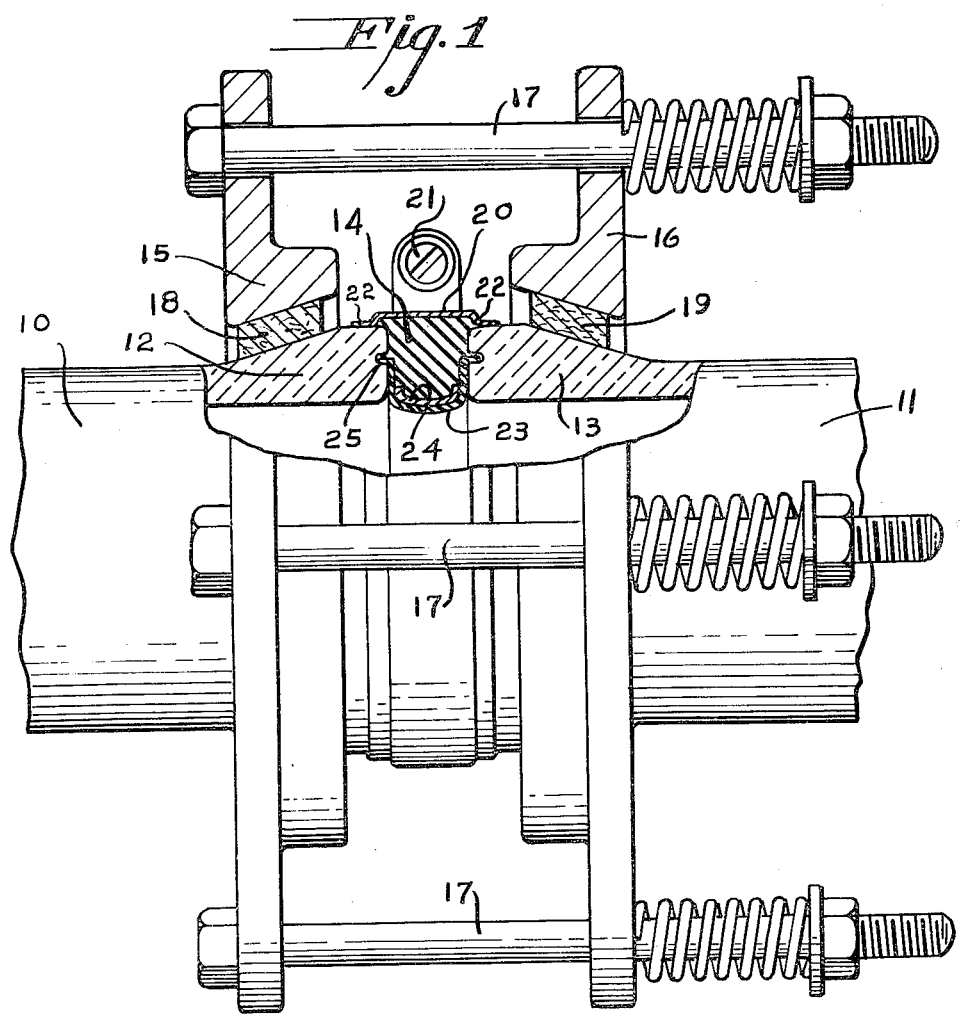
Figure 2:
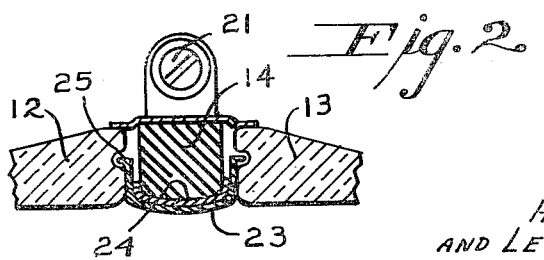

A preferred embodiment of the invention is illustrated in the accompanying drawing, in which:

FIG. 1 represents a side elevational view, partly in section, of a pipe coupling according to the invention, and FIG. 2 is a fragmentary sectional view of the coupling of FIG. 1 prior to the tightening of the bolts therein.

In the drawing, pipe sections 10 and 11 have their respective ends 12 and 13 flared as illustrated. Between the flared ends is located an annular gasket 14, composed of a low durometer material, preferably silicone rubber. This material must be capable of flowing about the annular channel between the pipes as localized forces are applied when the pipes are subjected to angular displacement with respect to one another. Accordingly, it has been found desirable to have a durometer rating of 35 or less as measured on the Shore A scale, and herein the term "low durometer" is used to describe those materials having such ratings.

Pipes 10 and 11 are pressed together axially by means of clamping rings 15 and 16, which are in turn forced together by a plurality of spring-loaded bolts 17. Clamping rings 15 and 16 do not bear directly on the flared ends of the respective pipe sections, but bear respectively upon interposed molded asbestos inserts 18 and 19. These inserts are utilized in order to permit clamping rings 15 and 16 to be of sufficient diameter to allow them to pass over flared ends 12 and 13 during assembly of the coupling. The inserts are in the form of split rings to allow them to pass over the flared ends. Although preferable, the use of such inserts is not essential, since the clamping rings themselves can be split to allow them to pass over the flared ends.

Gasket 14 is confined at its outer circumference by means of annular outer band 20. The band is tightened about the pipe ends by means of adjustment screw 21, and is preferably provided with inwardly projecting rims 22 to aid in centering gasket 14 in the band prior to application of the coupling to the pipes and to aid in retaining the gasket within the coupling when pipes 10 and 11 are subjected to angular misalignment.

In the illustrated embodiment of the invention the inner band is made up of two separate parts. These are a non-corrosive protective band 23, which may be made of polytetrafluoroethylene or any other material which resists corrosion by the particular fluids to be transported, and strengthening band 24, which prevents deformation of the relatively elastic protective band under the temperatures and pressures to which the coupling is subjected during use, and which is preferably made of a strong metal. Both bands are inwardly convex and are pressed between the opposed ends of the pipes. Protective band 23 is preferably provided with circumferential projections 25 which fit into complementary grooves in the ends of the pipes.

This double inner band arrangement has been found desirable in order to provide maximum strength and maximum protection of the coupling against attack by corrosive fluids carried in the pipes. It will, however, be understood that such arrangement, although preferable, is not essential, and the inner band may consist of one piece, for example, a metal band coated with polytetrafluoroethylene.

As can be seen in FIG. 1, gasket 14 completely fills the coupling space bounded by the pipe ends and the inner and outer bands. Due to the softness of the gasket material the gasket acts like a confined viscous fluid and flows within the coupling space to accommodate angular reorientations between he pipes. The configuration of the gasket and the remainder of the coupling prior to the tightening of bolts is shown in FIG. 2.

Couplings according to the present invention are capable of withstanding operating pressures of 150 p.s.i.g., temperatures as high as 450° F. and angular misalignment up to 3°.

We claim:

In a flexible coupling between two sections of pipe having flared ends with circumferential grooves therein, the combination of an outer band overlapping the outer surfaces of said flared ends and having inwardly projecting rims for maintaining contact with said outer surfaces, a corrosion-resistant inwardly convex inner liner having its edges located between said flared ends and having circumferential projections fitting into said circumferential grooves, adjacent to the outer surface of said inner liner a relatively rigid inwardly convex ring, a gasket comprising a low durometer material confined within an annular space bounded by said outer band, said ring, said inner liner, and said ends of said pipe sections, said annular space being occupied solely by said gasket and means for resiliently pressing said pipe sections in an axial direction against said gasket.

(References on following page)

References Cited by the Examiner

UNITED STATES PATENTS

| | | | |
|---|---|---|---|
| 1,493,269 | 5/24 | Kruesi | 285—336 X |
| 1,497,549 | 6/24 | Conradi | 285—373 |
| 1,861,211 | 5/32 | Gammeter | 285—106 |
| 1,999,084 | 4/35 | Camerota | 277—228 |
| 2,259,609 | 10/41 | Boyd. | |
| 2,460,981 | 2/49 | Francisco | 285—233 |
| 2,533,868 | 12/50 | Anderson | 285—363 X |
| 2,688,500 | 9/54 | Scott | 285—364 |
| 3,116,078 | 12/63 | Scherer | 285—373 |

FOREIGN PATENTS

| | | |
|---|---|---|
| 548,642 | 10/22 | France. |
| 661,880 | 7/29 | France. |
| 486,262 | 11/29 | Germany. |
| 226,897 | 1/25 | Great Britain. |
| 335,650 | 10/30 | Great Britain. |
| 773,541 | 4/57 | Great Britain. |
| 834,853 | 5/60 | Great Britain. |

CARL W. TOMLIN, *Primary Examiner.*